(12) United States Patent
Nagayasu et al.

(10) Patent No.: US 9,827,554 B2
(45) Date of Patent: Nov. 28, 2017

(54) FISCHER-TROPSCH SYNTHESIS CATALYST, METHOD FOR PRODUCING SAME, AND METHOD FOR PRODUCING HYDROCARBON

(71) Applicant: JX NIPPON OIL & ENERGY CORPORATION, Tokyo (JP)

(72) Inventors: Yoshiyuki Nagayasu, Tokyo (JP); Kazuaki Hayasaka, Tokyo (JP); Eri Kosaka, Tokyo (JP); Koshi Takahama, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/430,026

(22) PCT Filed: Sep. 12, 2013

(86) PCT No.: PCT/JP2013/074697
§ 371 (c)(1),
(2) Date: Mar. 20, 2015

(87) PCT Pub. No.: WO2014/046009
PCT Pub. Date: Mar. 27, 2014

(65) Prior Publication Data
US 2016/0144345 A1 May 26, 2016

(30) Foreign Application Priority Data

Sep. 21, 2012 (JP) .................. 2012-208919
Jun. 25, 2013 (JP) .................. 2013-133177

(51) Int. Cl.
| | | |
|---|---|---|
| *C07C 27/00* | (2006.01) | |
| *C07C 27/06* | (2006.01) | |
| *B01J 21/00* | (2006.01) | |
| *B01J 21/04* | (2006.01) | |
| *B01J 23/00* | (2006.01) | |
| *B01J 23/02* | (2006.01) | |
| *B01J 23/40* | (2006.01) | |
| *B01J 23/42* | (2006.01) | |
| *B01J 23/75* | (2006.01) | |
| *C10G 2/00* | (2006.01) | |
| *B01J 21/08* | (2006.01) | |
| *B01J 23/46* | (2006.01) | |
| *B01J 35/10* | (2006.01) | |
| *B01J 23/89* | (2006.01) | |
| *B01J 37/08* | (2006.01) | |
| *B01J 32/00* | (2006.01) | |
| *B01J 37/18* | (2006.01) | |
| *B01J 37/02* | (2006.01) | |
| *B01J 35/02* | (2006.01) | |
| *B01J 35/08* | (2006.01) | |

(52) U.S. Cl.
CPC .............. *B01J 23/75* (2013.01); *B01J 21/08* (2013.01); *B01J 23/462* (2013.01); *B01J 23/8913* (2013.01); *B01J 32/00* (2013.01); *B01J 35/1019* (2013.01); *B01J 35/1038* (2013.01); *B01J 37/0207* (2013.01); *B01J 37/0244* (2013.01); *B01J 37/08* (2013.01); *C10G 2/00* (2013.01); *C10G 2/332* (2013.01); *C10G 2/333* (2013.01); *C10G 2/334* (2013.01); *B01J 35/023* (2013.01); *B01J 35/08* (2013.01); *B01J 35/1061* (2013.01); *B01J 37/0201* (2013.01); *B01J 37/18* (2013.01)

(58) Field of Classification Search
CPC ........ B01J 21/066; B01J 21/08; B01J 23/462; B01J 23/75; C07C 1/0435; C07C 2523/75
USPC ............... 502/242, 260, 261, 326, 349, 439; 518/715
See application file for complete search history.

(56) References Cited

U.S. PATENT DOCUMENTS

| | | | | | |
|---|---|---|---|---|---|
| 4,385,193 | A | * | 5/1983 | Bijwaard | B01J 23/75 502/242 |
| 4,522,939 | A | * | 6/1985 | Minderhoud | B01J 23/75 502/242 |
| 5,928,983 | A | * | 7/1999 | Culross | B01J 23/8896 502/150 |
| 6,313,062 | B1 | * | 11/2001 | Krylova | B01J 23/40 502/325 |
| 6,486,221 | B2 | * | 11/2002 | Lapidus | B01J 23/75 502/325 |

(Continued)

FOREIGN PATENT DOCUMENTS

CA    2790389 A1    9/2011

*Primary Examiner* — Cam N. Nguyen
(74) *Attorney, Agent, or Firm* — Andrews Kurth Kenyon LLP

(57) ABSTRACT

A process for producing a Fischer-Tropsch synthesis catalyst according to the present invention comprises a step of calcining a carrier precursor containing silica calcined at a temperature $T_1$ and a zirconium compound at a temperature $T_2$ to obtain a carrier; and a step of calcining a catalyst precursor containing the carrier and a cobalt compound and/or a ruthenium compound at a temperature $T_3$, wherein the content of the zirconium compound in the carrier precursor is 0.01 to 7% by mass in terms of zirconium oxide based on the total mass of the catalyst, and $T_1$, $T_2$, and $T_3$ satisfy conditions represented by expressions (1) to (3):

$T_1 \geq T_3$     (1)

$250°\ C. \leq T_2 \leq 450°\ C.$     (2)

$250°\ C. \leq T_3 \leq 450°\ C.$     (3).

2 Claims, No Drawings

(56) References Cited

U.S. PATENT DOCUMENTS

| | | | |
|---|---|---|---|
| 7,473,667 B2* | 1/2009 | Hagemeyer | B01J 19/0046 |
| | | | 502/240 |
| 7,541,310 B2* | 6/2009 | Espinoza | B01J 21/12 |
| | | | 502/260 |
| 7,544,285 B2* | 6/2009 | Domokos | B01J 21/06 |
| | | | 208/108 |
| 7,655,593 B2* | 2/2010 | Lok | B01J 23/75 |
| | | | 502/176 |
| 8,003,565 B2* | 8/2011 | Hagemeyer | B01J 23/40 |
| | | | 502/240 |
| 2007/0105963 A1 | 5/2007 | Ikeda et al. | |
| 2007/0112210 A1* | 5/2007 | Arndt | B01J 23/462 |
| | | | 549/555 |
| 2007/0149793 A1* | 6/2007 | Arndt | B01J 21/08 |
| | | | 549/555 |
| 2008/0200703 A1* | 8/2008 | Van Laar | B01J 21/08 |
| | | | 549/560 |
| 2013/0165703 A1* | 6/2013 | Weiner | C07C 29/149 |
| | | | 568/885 |

* cited by examiner

FISCHER-TROPSCH SYNTHESIS CATALYST, METHOD FOR PRODUCING SAME, AND METHOD FOR PRODUCING HYDROCARBON

CROSS-REFERENCE TO RELATED APPLICATIONS

This is a national phase application based on the PCT International Patent Application No. PCT/JP2013/074697 filed Sep. 12, 2013, claiming priority to Japanese Patent Application Nos. 2013-133177 and 2012-208919 filed Jun. 25, 2013 and Sep. 21, 2012, respectively, the entire contents of which are incorporated herein by reference.

TECHNICAL FIELD

The present invention relates to a Fischer-Tropsch synthesis catalyst, and a process for producing the same, and a process for producing hydrocarbon.

BACKGROUND ART

A reaction to synthesize a hydrocarbon from a synthesis gas including hydrogen and carbon monoxide as main components is called the Fischer-Tropsch synthesis (FT synthesis), and is used for production of fuels and the like. The FT synthesis is performed using a catalyst in which an active metal such as iron and cobalt is supported on a carrier such as silica and alumina (see Patent Literature 1, for example). Moreover, it is reported that these FT synthesis catalysts improve catalyst performance by using a metal compound as a second component in combination in addition to the active metal (see Patent Literature 2, for example).

CITATION LIST

Patent Literature

Patent Literature 1: Japanese Patent Application Laid-Open No. H4-227847
Patent Literature 2: Japanese Patent Application Laid-Open No. S59-102440

SUMMARY OF INVENTION

Technical Problem

In the FT synthesis, the FT synthesis catalyst deteriorates and the CO conversion rate reduces as the reaction time passes. If the deterioration of the FT synthesis catalyst can be suppressed, this will lead to improvement in productivity in production of hydrocarbon.

An object of the present invention is to provide an FT synthesis catalyst difficult to deteriorate, a process for producing the same, and a process for producing hydrocarbon using an FT synthesis catalyst difficult to deteriorate.

Solution to Problem

One aspect of the process for producing a Fischer-Tropsch synthesis catalyst according to the present invention is a process for producing a Fischer-Tropsch synthesis catalyst, comprising: a step of calcining a carrier precursor containing silica calcined at a temperature $T_1$ and a zirconium compound at a temperature $T_2$ to obtain a carrier; and a step of calcining a catalyst precursor containing the carrier and a cobalt compound and/or a ruthenium compound at a temperature $T_3$, wherein the content of the zirconium compound in the carrier precursor is 0.01 to 7% by mass in terms of zirconium oxide based on the total mass of the catalyst, and $T_1$, $T_2$, and $T_3$ satisfy conditions represented by expressions (1) to (3):

$$T_1 \geq T_3 \tag{1}$$

$$250°\ C. \leq T_2 \leq 450°\ C. \tag{2}$$

$$250°\ C. \leq T_3 \leq 450°\ C. \tag{3}$$

According to the process according to the present invention, an FT synthesis catalyst difficult to deteriorate in the FT synthesis reaction can be obtained.

The present inventors think the reason that the effect above is attained by the present invention as follows. First, various factors can be thought for deterioration of the FT synthesis catalyst, but the present inventors think that among these, water generated by the FT synthesis reaction is a great influence. Specifically, it is suggested that cobalt metal as the active site is oxidized by water generated and the catalyst deteriorates. In the present invention, it is presumed that the zirconium compound can be sufficiently fixed as amorphous zirconia by the conditions represented by expressions (2) and (3); thereby, water absorbing action is exhibited and deterioration by water is suppressed. It is also presumed that water generating from silica during calcining the cobalt compound and/or ruthenium compound can be suppressed by the conditions represented by expressions (1) and (3), and catalyst activity is sufficiently ensured by enabling sufficiently fixing cobalt oxide and/or ruthenium oxide while suppressing reducing in activity attributed to steaming cobalt and/or ruthenium. Moreover, the present inventors think that by controlling the content of the zirconium compound in the carrier precursor to be within the range above, the water absorbing action can be sufficiently obtained; and zirconia preventing reduction of cobalt and/or ruthenium can be suppressed, and this is one of factors to attain sufficient catalyst activity.

It is preferable that the carrier be a carrier in which a thin film of the zirconium compound and/or ruthenium oxide is supported on silica as an oxide. In this case, chain propagation probability α is high, long-chain hydrocarbon can be easily obtained, and productivity can be improved.

Another aspect of the process for producing a Fischer-Tropsch synthesis catalyst according to the present invention is a process for producing a Fischer-Tropsch synthesis catalyst, comprising: a step of calcining a catalyst precursor containing silica calcined at a temperature $T_4$, a zirconium compound, and a cobalt compound and/or ruthenium compound at a temperature $T_5$, wherein the content of the zirconium compound in the catalyst precursor is 0.01 to 7% by mass in terms of zirconium oxide based on the total mass of the catalyst, and $T_4$ and $T_5$ satisfy conditions represented by expressions (4) and (5):

$$T_4 \geq T_5 \tag{4}$$

$$250°\ C. \leq T_5 \leq 450°\ C. \tag{5}$$

According to the process, an FT synthesis catalyst difficult to deteriorate in the FT synthesis reaction can be obtained.

The present invention can provide the Fischer-Tropsch synthesis catalyst obtained by the process according to the present invention.

One aspect of the Fischer-Tropsch synthesis catalyst according to the present invention comprises a carrier containing silica and amorphous zirconia and cobalt oxide and/or ruthenium oxide supported on the carrier, wherein the content of amorphous zirconia is 0.01 to 7% by mass based on the total mass of the catalyst.

It is preferable that the carrier be a carrier in which a thin film of amorphous zirconia is supported on silica.

Another aspect of the Fischer-Tropsch synthesis catalyst according to the present invention comprises a carrier containing silica, and amorphous zirconia and cobalt oxide and/or ruthenium oxide supported on the carrier, wherein the content of amorphous zirconia is 0.01 to 7% by mass based on the total mass of the catalyst.

Further another aspect of the Fischer-Tropsch synthesis catalyst according to the present invention comprises a carrier obtained by calcining a carrier precursor containing silica and a zirconia compound at a temperature of 250° C. or higher and 450° C. or lower, and cobalt oxide and/or ruthenium oxide supported on the carrier, wherein the content of the zirconia compound in the carrier precursor is 0.01 to 7% by mass in terms of zirconium oxide based on the total mass of the catalyst, and a mesopore volume is 0.35 cm$^3$/g or more and a specific surface area is 130 m$^2$/g or more.

Herein, the mesopore refers to a pore "having a diameter of 2 nm or more and 50 nm or less" which is defined in International Union of Pure and Applied Chemistry (IUPAC).

The FT synthesis catalyst according to the present invention has the above configuration, and thereby can be difficult to deteriorate in the FT synthesis reaction, particularly in the initial period of the reaction.

The present inventors think the reason that the effects are attained by the present invention as follows. Deterioration of catalyst performance appears as reduction in the FT synthesis reaction rate. It is thought that this reduction is attributed to the followings: oil generates within pores by the FT synthesis reaction, and contact between cobalt as an active site and synthesis gas, for example, is inhibited. The FT generated oil generated within the pores of the catalyst desorbs at a constant rate attributed to the pore size. The present inventors think that if the mesopore volume is excessively small, desorption of the generated oil is insufficient, and this is a cause to significantly reduce the FT synthesis reaction rate in the initial period of the reaction. The present inventors think that if the catalyst according to the present invention has the mesopore volume of 0.35 cm$^3$/g or more and the specific surface area of 130 m$^2$/g or more, the catalyst is obtained in which the pores serving as the active site are sufficiently ensured, desorption of the generated oil within the pores is sufficiently fast, inhibition of contact is reduced, and deterioration is difficult while the catalyst has sufficient catalyst activity.

In the FT synthesis catalyst according to the present invention, from the perspective of suppressing the wear of the catalyst during the reaction, it is preferable that an average pore diameter of the silica be 10 to 15 nm. Here, the average pore diameter of silica means the average pore diameter measured by a nitrogen adsorption method.

The process for producing hydrocarbon according to the present invention reacts carbon monoxide with hydrogen gas in the presence of the Fischer-Tropsch synthesis catalyst according to the present invention to obtain hydrocarbon.

Advantageous Effect of Invention

According to the present invention, the FT synthesis catalyst difficult to deteriorate, the process for producing the same, and the process for producing hydrocarbon using the FT synthesis catalyst difficult to deteriorate can be provided.

DESCRIPTION OF EMBODIMENTS

A first process for producing an FT synthesis catalyst according to the present embodiment is a process for producing a Fischer-Tropsch synthesis catalyst comprising: a step of calcining a carrier precursor containing silica calcined at a temperature $T_1$ and a zirconium compound at a temperature $T_2$ to obtain a carrier; and a step of calcining a catalyst precursor containing the carrier and a cobalt compound and/or a ruthenium compound at a temperature $T_3$, wherein the content of the zirconium compound in the carrier precursor is 0.01 to 7% by mass in terms of zirconium oxide based on the total mass of the catalyst, and $T_1$, $T_2$, and $T_3$ satisfy conditions represented by expressions (1) to (3):

$$T_1 \geq T_3 \tag{1}$$

$$250° C. \leq T_2 \leq 450° C. \tag{2}$$

$$250° C. \leq T_3 \leq 450° C. \tag{3}$$

As silica used in the present embodiment, at least one selected from the group consisting of colloidal silica, water glass, Aerosil, aerogel, silica sol, silica gel, powder silica, and silicic acid salts can be preferably used.

It is preferable the specific surface area of silica be 50 to 500 m$^2$/g, and it is more preferable that the specific surface area of silica be 150 to 400 m$^2$/g. At a specific surface area of less than 50 m$^2$/g, an active metal such as cobalt tends to easily aggregate. Meanwhile, at a specific surface area of more than 500 m$^2$/g, the pore diameter tends to be excessively small and the pores tend to be easily clogged by support of the active metal such as cobalt.

Herein, the specific surface area means a value determined by measurement by the nitrogen adsorption method.

The specific surface area of silica is calculated by the following method. First, to remove the moisture content adsorbed by silica, a pre-treatment of evacuation at 300° C. for 5 hours is performed, for example. In silica after the pre-treatment, using a BELSORP-max made by BEL Japan, Inc., adsorption and desorption isotherms are automatically measured by the volumetric gas adsorption method at a liquid nitrogen temperature (−196° C.) using nitrogen. The analysis software (BEL Master™) attached to the apparatus can be used for analysis of data. The measured adsorption and desorption isotherms of nitrogen are automatically analyzed by the BET equation, and the surface area per unit mass of silica (m$^2$/g) is calculated.

It is preferable that the average pore diameter of silica be 8 to 25 nm, it is more preferable that the average pore diameter of silica be 10 to 20 nm, and it is still more preferable that the average pore diameter of silica be 10 to 15 nm. At an average pore diameter of less than 8 nm, reaction activity tends to reduce due to diffusion limitation. Meanwhile, at an average pore diameter of more than 25 nm, the surface area of the carrier reduces. For this reason, the supported metal tends to easily aggregate, leading to reduction in reaction activity.

Moreover, from the perspective of suppressing the wear of the catalyst during the reaction, it is preferable that the average pore diameter of silica be 10 to 15 nm.

Herein, the average pore diameter means a value determined by measurement by the nitrogen adsorption method.

The average pore diameter of silica is calculated by the following method. First, to remove the moisture content adsorbed by silica, a pre-treatment of evacuation at 300° C. for 5 hours is performed, for example. In silica after the pre-treatment, using a BELSORP-max made by BEL Japan, Inc., adsorption and desorption isotherms are automatically measured by the volumetric gas adsorption method at a liquid nitrogen temperature (−196° C.) using nitrogen. The analysis software (BEL Master™) attached to the apparatus can be used for analysis of data. The measured adsorption and desorption isotherms of nitrogen are automatically analyzed by the BJH method, and the average pore diameter of silica is calculated.

Moreover, the shape of silica is not particularly limited, and articles having a variety of shapes such as spherical articles, crushed articles, and cylindrical molded articles can be used, and a shape suitable for the process can be selected. The average particle size of silica is not limited, either. For example, silica having an average particle size of 5 μm to 10 mm, preferably 5 μm to 5 mm, more preferably 5 to 150 μm, and still more preferably 10 to 100 μm can be properly selected according to the process and used. The average particle size of silica can be measured using a particle size distribution measurement apparatus. For example, using a Coulter Counter Multisizer 3 made by Beckman Coulter, Inc., the average particle size is automatically measured and calculated by the electrical sensing zone method (Coulter principle).

It is preferable that the calcining temperature $T_1$ of silica satisfy the equation (1). It is preferable that the calcining temperature $T_1$ of silica be 250 to 700° C. and it is more preferable that the calcining temperature $T_1$ of silica be 400 to 650° C. because if silica is calcined at a high temperature, silica sinters, and a desired pore diameter tends to be difficult to obtain. The calcining time can be 0.5 to 10 hours, for example. calcining can be performed, for example, in the presence of molecular oxygen such as in the air.

One or more carrier materials other than silica selected from the group consisting of alumina, titania, magnesia, ceria, and zirconia, and composite oxides thereof can be contained in the carrier precursor. Examples of the composite oxides include silica-alumina, silica-titania, alumina-titania, silica-zirconia, alumina-zirconia, and titania-zirconia.

Examples of the zirconium compound used in the present embodiment include zirconyl nitrate ($ZrO(NO_3)_2$), zirconium oxychloride ($ZrOCl_2$), zirconium oxohydroxychloride ($ZrO(OH)Cl$), zirconyl sulfate ($ZrOSO_4$), zirconyl acetate ($ZrO(C_2H_3O_2)_2$), and zirconyl ammonium carbonate (($NH_4)_2ZrO(CO_3)_2$). Among these, zirconyl nitrate, zirconyl acetate, and zirconyl ammonium carbonate are preferable. One of these zirconium compounds can be used alone, or two or more can be used in combination.

As the method for preparing the carrier precursor, an impregnation method such as an incipient wetness method can be used. At this time, the content of the zirconium compound in the carrier precursor is set to be 0.01 to 7% by mass in terms of zirconium oxide based on the total mass of the catalyst. A large amount of zirconia may reduce reduction properties of cobalt and/or ruthenium, causing reduction in initial activity. For this reason, it is preferable that the content of the zirconium compound in the carrier precursor be 0.1 to 6% by mass in terms of zirconium oxide based on the total mass of the catalyst, and it is more preferable that the content of the zirconium compound in the carrier precursor be 0.5 to 5.5% by mass in terms of zirconium oxide based on the total mass of the catalyst.

The carrier precursor, after impregnation, can be dried, for example, at a drying temperature of preferably 50 to 150° C., and more preferably 70 to 120° C. for preferably 0.5 to 48 hours, and more preferably 1 to 24 hours.

The calcining temperature $T_2$ of the carrier precursor is 250° C. or higher and 450° C. or lower. To easily obtain amorphous anhydrous zirconia, the calcining temperature $T_2$ of 300 to 400° C. is preferable, and the calcining temperature $T_2$ of 350 to 400° C. is more preferable. At $T_2$ of higher than 450° C., the form of zirconia changes from an amorphous form to a crystal form. For this reason, this is not preferable. At $T_2$ of lower than 250° C., the calcining temperature is equal to or lower than the decomposition start temperature of the zirconia compound, and sufficient catalyst activity is difficult to obtain. For this reason, it is preferable that the calcining temperature be equal to or higher than the decomposition start temperature of the zirconia compound to be used.

Moreover, the calcining temperature $T_2$ of the carrier precursor is 250° C. or higher and 450° C. or lower. From the perspective of keeping a high mesopore volume, the calcining temperature of 250 to 300° C. is more preferable.

In the present embodiment, it is preferable that the carrier precursor be prepared by the process as shown below and calcined such that a carrier in which a thin film of the zirconium compound as an oxide is supported on silica can be obtained.

First, silica particles are pre-treated in an aqueous solution with a pH of 7 or less. Examples of the aqueous solution with a pH of 7 or less used at this time (pre-treatment solution) include nitric acid aqueous solutions, acetic acid aqueous solutions, sulfuric acid aqueous solutions, hydrochloric acid aqueous solutions, ion exchange water, and distilled water. It is preferable that the pH of the treatment solution be 5 to 7, and it is more preferable that the pH of the treatment solution be 6 to 7. At a pH of less than 5, in support of the zirconium compound which is performed after the pre-treatment, the concentration of the zirconium compound solution to be used needs to be increased to support a necessary amount of the zirconium compound. For this reason, this is not economically preferable. The pre-treatment can be performed, for example, by adding the pre-treatment solution into the container containing the silica particles. It is preferable that the time for impregnating the silica particles with the pre-treatment solution be approximately 10 to 72 hours in the case where the solution is left as it is, approximately 1 to 12 hours in the case where vibration is given, and approximately 1 to 30 minutes in the case where the solution is irradiated with an ultrasonic wave.

After the pre-treatment is performed, an excessive amount of the solution containing the zirconium compound is added into the container containing the pre-treated silica particles, and the silica particles are impregnated with the solution. Thereby, the zirconium compound can be supported on the silica particles. At this time, it is preferable that a supernatant portion of the pre-treatment solution after the pre-treatment be removed in advance. The term "excessive amount" here means the volume amount of the solution containing the zirconium compound twice or more the volume of the silica particles.

The amount of the zirconium compound to be used is set in the same manner as above to be 0.01 to 7% by mass in terms of zirconium oxide based on the total mass of the catalyst. A large amount of zirconia may reduce reduction properties of cobalt and/or ruthenium, causing reduction in initial activity. For this reason, it is preferable that the amount of the zirconium compound to be used be 0.1 to 6% by mass in terms of zirconium oxide based on the total mass of the catalyst, and it is more preferable that the amount of the zirconium compound to be used be 0.5 to 5.5% by mass in terms of zirconium oxide based on the total mass of the catalyst.

The time for impregnating silica particles with the solution containing the zirconium compound thereby supporting the zirconium compound depends on the target amount of the zirconium compound to be supported and is not particularly limited. The time is typically 3 to 72 hours.

After support of the zirconium compound is completed, the remaining solution is separated from the carrier precursor (zirconium compound-supported silica particles), and the carrier precursor is dried. The drying method is not particularly limited, and examples thereof include heat drying in the air and degassing drying under reduced pressure. Typically, drying is performed at a temperature of 100 to 200° C., and preferably 110 to 130° C. for 2 to 24 hours, and preferably 5 to 12 hours.

After drying, the carrier precursor (zirconium compound-supported silica particles) is calcined at the temperature $T_2$ to convert the zirconium compound into an oxide.

Thus, a carrier in which a thin film of the zirconium compound as an oxide is supported on silica can be obtained.

Typically, the supported compound in the support solution is adsorbed by a hydroxyl group on the surface of the carrier in the support step, and fixed through the subsequent calcining and/or drying step. Then, support is completed. In the carrier having pores, the support solution is diffused within the pores by the capillary action, and the supported compound is adsorbed by the hydroxyl group on the surface within the pores. Thereby, the supported compound is supported within the pores. At this time, if maldistribution or aggregation of the supported compound within the pores occurs, clogging of the pores is caused, leading to reduction in the specific surface area. Accordingly, by comparing the specific surface area and the pore diameter before support of the supported compound with those after support of the supported compound, an index indicating whether the supported compound is supported in a thin film state can be obtained. Clogging of the pores also influences the amount of the supported compound to be supported. Specifically, if the amount of the supported compound to be supported within the pores is large, clogging of the pores tends to occur. For this reason, the amount of the supported compound that clogs the pores which is derived from the amount of the supported compound to be supported needs to be corrected when the index indicating whether the supported compound is supported in a thin film state is obtained.

In the present embodiment, it is preferable that the thin film index Z represented by the equation derived from the view be 0.1 or more, it is more preferable that the thin film index Z represented by the equation derived from the view be 0.12 or more, and it is still more preferable that the thin film index Z represented by the equation derived from the view be 0.15 or more. At a thin film index Z of 0.15 or more, this means that clogging of the pores caused by maldistribution or aggregation of the supported compound hardly occurs within the pores.

$$Z=[(B1/A1)\times(B2/A2)^2]^R \times (Y/X)$$

(wherein R represents R=1 at Y/(X−Y)≤1, and represents R=Y/(X−Y) at Y/(X−Y)>1)
A1: specific surface area of silica (m²/g), A2: average pore diameter of silica (nm), B1: specific surface area of silica supporting zirconium as an oxide (m²/g), B2: average pore diameter of silica (nm) supporting zirconium as an oxide, X: A1×4.74×10⁻², Y: % by mass of supported zirconium (the value in terms of zirconia oxide based on the total mass of the carrier).

Examples of the process that satisfies the condition above include a process in which air bubbles within the pores of silica are removed; then, when silica is impregnated with the aqueous solution of the zirconium compound, the impregnation time, the concentration of the aqueous solution, and the impregnation temperature and pH are adjusted, and the hydrolysis rate is controlled such that reduction in the specific surface area of silica is suppressed to be 5% or less, preferably 4% or less, and more preferably 3% or less and reduction in the average pore diameter is suppressed to be 25% or less, and preferably 23% or less, more preferably 20% or less. As the method for removing air bubbles within the pores of silica, a method in which silica is immersed in distilled water, and irradiated with an ultrasonic wave, or a method in which silica is immersed in distilled water or an aqueous solution under reduced pressure is preferably used.

Next, the step of calcining the catalyst precursor containing the carrier obtained as above and a cobalt compound and/or ruthenium compound at a temperature $T_3$ will be described.

As the cobalt compound used in the present embodiment, a compound having cobalt as a salt or a complex in the molecule can be used. Examples of such a compound include nitric acid salts, hydrochloric acid salts, sulfuric acid salts, formic acid salts, acetic acid salts, propionic acid salts, oxalic acid salts, and acetylacetonate. Specifically, examples thereof include cobalt nitrate, cobalt chloride, cobalt formate, cobalt propionate, cobalt acetate, and cobalt acetylacetonate. One of these cobalt compounds can be used alone, or two or more can be used in combination.

Examples of the ruthenium compound used in the present embodiment include halogenated ruthenium such as ruthenium chloride and ruthenium bromide, ruthenium oxide (IV), ruthenium hydroxide (III), acetylacetonato ruthenium, hexaammineruthenium (II) chloride, and triruthenium dodecacarbonyl.

As the method for preparing the catalyst precursor, the impregnation method such as the incipient wetness method can be used. At this time, it is preferable that the content of the cobalt compound in the catalyst precursor be set to be 10 to 35% by mass in terms of cobalt oxide (tricobalt tetraoxide) based on the total mass of the catalyst, and it is preferable that the content of the cobalt compound in the catalyst precursor be set to be 15 to 35% by mass in terms of cobalt oxide (tricobalt tetraoxide) based on the total mass of the catalyst. From the perspective of obtaining high reactivity, it is more preferable that the content of the cobalt compound in the catalyst precursor be 15 to 30% by mass in terms of cobalt oxide (tricobalt tetraoxide) based on the total mass of the catalyst, and it is still more preferable that the content of the cobalt compound in the catalyst precursor be 20 to 30% by mass in terms of cobalt oxide (tricobalt tetraoxide) based on the total mass of the catalyst.

Moreover, in the case where the ruthenium compound is used, it is preferable that the content of the ruthenium compound in the catalyst precursor be set to be 5 to 35% by mass in terms of ruthenium oxide ($RuO_2$) based on the total mass of the catalyst. From the perspective of obtaining high reactivity, it is more preferable that the content of the ruthenium compound in the catalyst precursor be 10 to 20% by mass in terms of ruthenium oxide ($RuO_2$) based on the total mass of the catalyst.

The catalyst precursor, after impregnation, can be dried, for example, at a drying temperature of preferably 50 to 150°

C., and more preferably 70 to 120° C. for preferably 0.5 to 48 hours, and more preferably 1 to 24 hours.

As the calcining temperature $T_3$ of the catalyst precursor, 250° C. or higher and 450° C. or lower is preferable. The calcining temperature of 300 to 450° C. is preferable, and 350 to 450° C. is more preferable such that cobalt particles and/or ruthenium particles are highly dispersed. At $T_3$ of higher than 450° C., the form of zirconia changes from an amorphous form to a crystal form. For this reason, this is not preferable. It is preferable that the calcining temperature be equal to or higher than the decomposition start temperature of the cobalt compound and/or ruthenium compound to be used.

Moreover, from the perspective of obtaining high dispersibility of the cobalt compound and/or ruthenium compound, the calcining temperature of 400 to 450° C. is more preferable.

The second process for producing a Fischer-Tropsch synthesis catalyst according to the present embodiment is a process for producing a Fischer-Tropsch synthesis catalyst comprising: a step of calcining a catalyst precursor containing silica calcined at a temperature $T_4$, a zirconium compound, and a cobalt compound and/or ruthenium compound at a temperature $T_5$, wherein the content of the zirconium compound in the catalyst precursor is 0.01 to 7% by mass in terms of zirconium oxide based on the total mass of the catalyst, and $T_4$ and $T_5$ satisfy conditions represented by expressions (4) and (5):

$$T_4 \geq T_5 \quad (4)$$

$$250°\ C. \leq T_5 \leq 450°\ C. \quad (5)$$

For silica, the zirconium compound, the cobalt compound, and the ruthenium compound used in the present embodiment, those listed in the first process can be used. Moreover, a carrier material other than silica described above may be contained in the catalyst precursor.

As the method for preparing the catalyst precursor, the impregnation method such as the incipient wetness method can be used.

In the present embodiment, the content of the zirconium compound in the catalyst precursor is set to be 0.01 to 7% by mass in terms of zirconium oxide based on the total mass of the catalyst. A large amount of zirconia may reduce reduction properties of cobalt, causing reduction in initial activity. For this reason, it is preferable that the content of the zirconium compound in the catalyst precursor be 0.1 to 6% by mass in terms of zirconium oxide based on the total mass of the catalyst, and it is more preferable that the content of the zirconium compound in the catalyst precursor be 0.5 to 5.5% by mass in terms of zirconium oxide based on the total mass of the catalyst.

Moreover, it is preferable that the content of the cobalt compound in the catalyst precursor be set to be 10 to 35% by mass in terms of cobalt oxide (tricobalt tetraoxide) based on the total mass of the catalyst, and it is preferable that the content of the cobalt compound in the catalyst precursor be set to be 15 to 35% by mass in terms of cobalt oxide (tricobalt tetraoxide) based on the total mass of the catalyst. From the perspective of obtaining high reactivity, it is more preferable that the content of the cobalt compound in the catalyst precursor be 15 to 30% by mass in terms of cobalt oxide (tricobalt tetraoxide) based on the total mass of the catalyst, and it is still more preferable that the content of the cobalt compound in the catalyst precursor be 20 to 30% by mass in terms of cobalt oxide (tricobalt tetraoxide) based on the total mass of the catalyst.

Moreover, in the case where the ruthenium compound is used, it is preferable that the content of the ruthenium compound in the catalyst precursor be set to be 5 to 35% by mass in terms of ruthenium oxide ($RuO_2$) based on the total mass of the catalyst. From the perspective of obtaining high reactivity, it is more preferable that the content of the ruthenium compound in the catalyst precursor be 10 to 20% by mass in terms of ruthenium oxide ($RuO_2$) based on the total mass of the catalyst.

The catalyst precursor, after impregnation, can be dried, for example, at a drying temperature of preferably 50 to 150° C., and more preferably 70 to 120° C. for preferably 0.5 to 48 hours, and more preferably 1 to 24 hours.

The calcining temperature $T_5$ of the catalyst precursor is 250° C. or higher and 450° C. or lower. The calcining temperature of 300 to 450° C. is preferable, and the calcining temperature of 350 to 450° C. is more preferable such that the cobalt particles and/or ruthenium particles are highly dispersed. At $T_5$ of higher than 450° C., the form of zirconia changes from an amorphous form to a crystal form. For this reason, this is not preferable. Moreover, it is preferable that the calcining temperature be equal to or more than the decomposition start temperature of the zirconia compound to be used and the decomposition start temperature of the cobalt compound and/or ruthenium compound.

Moreover, from the perspective of obtaining high dispersibility of the cobalt compound and/or ruthenium compound, the calcining temperature of 400 to 450° C. is more preferable.

The first and second Fischer-Tropsch synthesis catalysts according to the present embodiment may further contain a noble metal. As the noble metal, one or more of Pt, Ru, Pd, Au, and Re are preferable, and Pt is more preferable. If the noble metal is contained, reduction of cobalt can be accelerated. Thereby, oxidation of cobalt metal caused by water generated during the Fischer-Tropsch synthesis reaction, which is presumed as a factor to deteriorate the catalyst, can be suppressed.

From the perspective of the balance between the effects above and economy, it is preferable that the amount of the noble metal to be supported be 0.001 to 1% by mass based on the total mass of the catalyst, and it is more preferable that the amount of the noble metal to be supported be 0.001 to 0.5% by mass based on the total mass of the catalyst.

Next, the Fischer-Tropsch synthesis catalyst according to the present invention will be described.

The first FT synthesis catalyst according to the present embodiment comprises a carrier containing silica and amorphous zirconia, and cobalt oxide and/or ruthenium oxide supported on the carrier, wherein the content of amorphous zirconia is 0.01 to 7% by mass based on the total mass of the catalyst.

The catalyst can be obtained by the first production process according to the present embodiment, for example.

From the perspective of obtaining high chain propagation probability α, it is preferable that the carrier be a carrier in which a thin film of amorphous zirconia is supported on silica.

In the first FT synthesis catalyst, it is preferable that the content of amorphous zirconia be 0.1 to 6% by mass, and it is more preferable that the content of amorphous zirconia be 0.5 to 5.5% by mass.

In the first FT synthesis catalyst, it is preferable that the content of cobalt oxide be 10 to 35% by mass, it is more preferable that the content of cobalt oxide be 10 to 30% by mass, and it is still more preferable that the content of cobalt oxide be 15 to 30% by mass.

In the first FT synthesis catalyst, it is preferable that the content of ruthenium oxide be 5 to 35% by mass, and it is more preferable that the content of ruthenium oxide be 10 to 20% by mass.

In the case where the first FT synthesis catalyst contains cobalt oxide and ruthenium oxide, it is preferable that the total content of these be 5 to 35% by mass based on the total mass of the catalyst, and it is more preferable that the total content of these be 10 to 30% by mass based on the total mass of the catalyst.

The second FT synthesis catalyst according to the present embodiment comprises a carrier containing silica, and amorphous zirconia and cobalt oxide and/or ruthenium oxide supported on the carrier, wherein the content of amorphous zirconia is 0.01 to 7% by mass based on the total mass of the catalyst.

The catalyst can be obtained by the second production process according to the present embodiment.

In the second FT synthesis catalyst, it is preferable that the content of amorphous zirconia be 0.1 to 6% by mass, and it is more preferable that the content of amorphous zirconia be 0.5 to 5.5% by mass.

In the second FT synthesis catalyst, it is preferable that the content of cobalt oxide be 10 to 35% by mass, it is more preferable that the content of cobalt oxide be 10 to 30% by mass, and it is still more preferable that the content of cobalt oxide be 20 to 30% by mass.

In the second FT synthesis catalyst, it is preferable that the content of ruthenium oxide be 5 to 35% by mass, and it is more preferable that the content of ruthenium oxide be 10 to 20% by mass.

In the case where the second FT synthesis catalyst contains cobalt oxide and ruthenium oxide, it is preferable that the total content of these be 5 to 35% by mass based on the total mass of the catalyst, and it is more preferable that the total content of these be 10 to 30% by mass based on the total mass of the catalyst.

The third FT synthesis catalyst according to the present embodiment comprises a carrier obtained by calcining a carrier precursor containing silica and a zirconia compound at a temperature of 250° C. or higher and 450° C. or lower, and cobalt oxide and/or ruthenium oxide supported on the carrier, wherein the content of the zirconia compound in the carrier precursor is 0.01 to 7% by mass in terms of zirconium oxide based on the total mass of the catalyst, and a mesopore volume is 0.35 cm$^3$/g or more and a specific surface area is 130 m$^2$/g or more.

The mesopore volume of the catalyst is calculated by the following method. First, to remove the moisture content adsorbed by the FT synthesis catalyst, a pre-treatment of evacuation at 300° C. for 5 hours is performed, for example. In the catalyst after the pre-treatment, using a BELSORP-max made by BEL Japan, Inc., adsorption and desorption isotherms are automatically measured by the volumetric gas adsorption method at a liquid nitrogen temperature (−196° C.) using nitrogen. The analysis software (BEL Master™) attached to the apparatus can be used for analysis of data. The measured adsorption and desorption isotherms of nitrogen are automatically analyzed by the BJH method, and the mesopore volume of the FT synthesis catalyst per unit mass (cm$^3$/g) is calculated. The BJH method is a method for determining the average pore diameter from the desorption isotherm that is the relationship of a relative pressure when an adsorbate desorbs and the adsorption amount. (E. P. Barrett, L. G. Joyner, P. H. Halenda: J. Am. Chem. Soc., 73, 373 (1951).)

It is preferable that the mesopore volume of the catalyst be 0.35 to 0.8 cm$^3$/g, and it is more preferable that the mesopore volume of the catalyst be 0.4 to 0.7 cm$^3$/g. At a mesopore volume of the catalyst less than 0.35 cm$^3$/g, deterioration of the catalyst tends to easily occur in the initial period of the reaction. Meanwhile, at a mesopore volume of the catalyst more than 0.8 cm$^3$/g, the pores become excessively large, and wear of the catalyst easily occurs. For this reason, deterioration of the catalyst caused by wear loss tends to easily occur during the reaction.

The specific surface area of the catalyst is calculated by the following method. First, to remove the moisture content adsorbed by the FT synthesis catalyst, a pre-treatment of evacuation at 300° C. for 5 hours is performed, for example. In the catalyst after the pre-treatment, using a BELSORP-max made by BEL Japan, Inc., adsorption and desorption isotherms are automatically measured by the volumetric gas adsorption method at a liquid nitrogen temperature (−196° C.) using nitrogen. The analysis software (BEL Master™) attached to the apparatus can be used for analysis of data. The measured adsorption and desorption isotherms of nitrogen are automatically analyzed by the BET equation, and the surface area of the FT synthesis catalyst per unit mass (m$^2$/g) is calculated.

It is preferable that the specific surface area of the catalyst be 130 to 400 m$^2$/g, and it is more preferable that the specific surface area of the catalyst be 140 to 200 m$^2$/g. At a specific surface area less than 130 m$^2$/g, deterioration of the catalyst tends to easily occur in the initial period of the reaction. Meanwhile, at a specific surface area more than 400 m$^2$/g, wear of the catalyst easily occurs during the reaction, and deterioration of the catalyst caused by wear loss tends to easily occur.

Examples of silica used in the present embodiment include those described above. It is preferable that silica be calcined at the predetermined calcining temperature $T_1$.

In the third FT synthesis catalyst, from the perspective of suppressing the wear of the catalyst during the reaction, it is preferable that the average pore diameter of silica be 10 to 15 nm.

In the third FT synthesis catalyst, the content of the zirconia compound in the carrier precursor is 0.01 to 7% by mass in terms of zirconium oxide based on the total mass of the catalyst. A large amount of zirconia may reduce reduction properties of cobalt or ruthenium, leading to reduction in initial activity. For this reason, it is preferable that the content of the zirconia compound be 0.1 to 6% by mass, and it is more preferable that the content of the zirconia compound be 0.5 to 5.5% by mass.

In the third FT synthesis catalyst, from the perspective of obtaining high wax selectivity and high reactivity, it is preferable that the content of cobalt oxide be 10 to 35% by mass based on the total mass of the catalyst, and it is more preferable that the content of cobalt oxide be 20 to 30% by mass based on the total mass of the catalyst.

In the third FT synthesis catalyst, it is preferable that the content of ruthenium oxide be 5 to 35% by mass based on the total mass of the catalyst, and it is more preferable that the content of ruthenium oxide be 10 to 20% by mass based on the total mass of the catalyst. That the FT synthesis catalyst in which ruthenium is an active site has activity and wax selectivity higher than those of cobalt as the feature, and the amount of the catalyst to be used can be significantly reduced.

In the case where the third FT synthesis catalyst contains cobalt oxide and ruthenium oxide, it is preferable that the total content of these be 5 to 35% by mass based on the total mass of the catalyst, and it is more preferable that the total content of these be 10 to 30% by mass based on the total mass of the catalyst.

In the third FT synthesis catalyst, it is preferable that the attrition (catalyst wear rate) measured based on the specification according to ASTM D5757 be 3% or less, and it is more preferable that the attrition (catalyst wear rate) be 1.5% or less. At an attrition of more than 3%, wear of the catalyst easily occurs during the reaction in the FT synthesis reaction process, and industrial use of the catalyst is difficult from the perspective of wear loss.

The measurement of the attrition (catalyst wear rate) is performed according to Standard ASTM D5757 defined by ASTM International "Standard Test Method for Determination of Attrition of FCC Catalysts by Air Jets."

As the average particle size of the third FT synthesis catalyst, 10 µm to 10 mm is preferable, 10 µm to 5 mm is more preferable, 10 to 150 µm is still more preferably, and 30 to 100 µm is further still more preferable. The average particle size of the catalyst can be measured using a particle size distribution measurement apparatus. For example, using a Coulter Counter Multisizer 3 made by Beckman Coulter, Inc., the average particle size is automatically measured by the electrical sensing zone method (Coulter principle) and calculated.

The third FT synthesis catalyst can be obtained, for example, by the first production process according to the present embodiment.

The FT synthesis catalyst according to the present embodiment can further contain noble metal. As the noble metal, one or more of Pt, Pd, Au, and Re are preferable, and Pt is more preferable. If the noble metal is contained, reduction of cobalt and/or ruthenium can be accelerated. Thereby, oxidation of cobalt metal caused by water generated during the Fischer-Tropsch synthesis reaction, which is presumed as a factor to deteriorate the catalyst, can be suppressed.

From the perspective of the balance between the effects above and economy, it is preferable that the amount of the noble metal to be supported be 0.001 to 1% by mass based on the total mass of the catalyst, and it is more preferable that the amount of the noble metal to be supported be 0.001 to 0.5% by mass based on the total mass of the catalyst.

It is preferable that the FT synthesis catalyst according to the present embodiment be subjected to a reduction treatment with hydrogen or the like in advance when the catalyst is fed to the FT synthesis reaction.

Reduction can be performed, for example, under an atmosphere containing molecular hydrogen. The gas used for reduction is not particularly limited as long as the gas contains molecular hydrogen (hydrogen gas). It is preferable that the gas contains 70% by volume or more of molecular hydrogen, and it is more preferable that the gas contains 95% by volume or more of molecular hydrogen. At a content of molecular hydrogen less than 70% by volume, efficiency of reduction tends to be insufficient, and this is not preferable. Examples of the specific gas used for reduction include hydrogen gas, and a mixed gas of hydrogen gas and an inert gas such as nitrogen gas, and hydrogen gas is particularly preferable. In the case where the gas used for reduction further contains carbon monoxide, mixing is not preferable because the FT synthesis reaction may be made during reduction on a high pressure reduction condition in which the absolute pressure is 1.1 MPa or more, causing problems such as heat generation. However, mixing of a slight amount of carbon monoxide can be allowed.

It is preferable that the reduction temperature be 250 to 500° C., and it is more preferable that the reduction temperature be 350 to 450° C. At a reduction temperature of lower than 250° C., the reduction degree of a cobalt atom (the amount by mole of metal cobalt after the reduction step to the amount by mole of cobalt oxide before the reduction step) tends to be not sufficiently increased. Meanwhile, at a reduction temperature higher than 500° C., aggregation of metal cobalt excessively progresses. For this reason, activity tends to reduce.

The reduction pressure is not particularly limited, and the pressure ranging from normal pressure to approximately 5 MPa is selected. The reduction time greatly depends on the temperature, the atmosphere, the apparatus to be used, and the like, and is difficult to specify in general. Typically, the reduction time is approximately 0.5 to 60 hours.

Reduction of the catalyst may be performed within a catalyst production facility. Moreover, reduction of the catalyst may be performed in a facility that performs production of hydrocarbon by the FT synthesis method or a facility attached thereto.

Using the FT synthesis catalyst according to the present embodiment, carbon monoxide and hydrogen gas can be subjected to the FT synthesis reaction to produce hydrocarbon.

As the raw material when the FT synthesis reaction is performed, the raw material is not particularly limited as long as the raw material is a synthesis gas containing hydrogen and carbon monoxide as main components. It is preferable that the molar ratio of hydrogen/carbon monoxide be 1.5 to 2.5, and it is more preferable that the molar ratio of hydrogen/carbon monoxide be 1.8 to 2.2.

The FT synthesis catalyst according to the present embodiment can be used in the process known as the reaction process of the FT synthesis such as a fixed bed, a supercritical fixed bed, a slurry bed, and a fluidized bed. Examples of a preferable process include a fixed bed, a supercritical fixed bed, and a slurry bed.

The reaction condition for the FT synthesis reaction is not particularly limited, and the FT synthesis reaction can be performed on a known condition. For example, the reaction can be performed at a reaction temperature ranging from 200 to 280° C., a gas space velocity ranging from 1000 to 3000 $h^{-1}$, W (mass of the catalyst)/F (flow rate of the synthesis gas) ranging from 1 to 10 g·h/mol, and an absolute pressure ranging from 1.1 to 5.1 MPa.

EXAMPLES

Example A-1

<Preparation of FT Synthesis Catalyst>

A spherical silica particle (average pore diameter of 10 nm, average particle size of 70 µm) was calcined in the air at 450° C. for 3 hours. Next, by the incipient wetness method, the calcined silica particle was impregnated with 3% by mass of zirconyl nitrate in terms of zirconium oxide based on the total mass of the FT synthesis catalyst to be formed. The silica particle after impregnated with zirconyl nitrate was dried at 120° C. for 12 hours, and subsequently calcined in the air at 350° C. for 3 hours to obtain a carrier.

By the incipient wetness method, the obtained carrier was impregnated with 30% by mass of an nitric acid cobalt aqueous solution in terms of tricobalt tetraoxide based on the total mass of the FT synthesis catalyst to be formed. The carrier after impregnated with the nitric acid cobalt aqueous solution was dried at 120° C. for 12 hours, and subsequently calcined in the air at 450° C. for 3 hours to obtain an FT synthesis catalyst.

The mass of the FT synthesis catalyst obtained here is the reference when the amounts of the zirconyl nitrate and nitric acid cobalt aqueous solution to be used for impregnation are determined. Namely, the mass in the state where the total amount of the supported zirconia atom is converted into zirconium oxide (zirconia) and the total amount of the supported cobalt atom is converted into tricobalt tetraoxide (cobalt oxide) is the reference.

<Reduction of FT Synthesis Catalyst>

The FT synthesis catalyst was reduced under a hydrogen stream at 350° C. for 7 hours to obtain an activated FT synthesis catalyst E-A1.

Example A-2

A spherical silica particle (average pore diameter of 10 nm, average particle size of 70 μm) was calcined in the air at 450° C. for 3 hours. Next, 30 g of silica after calcining was weighed and placed in a 250 ml glass bottle, 100 ml of a nitric acid aqueous solution at a pH of 6.6 was added thereto, and irradiated with an ultrasonic wave at 40° C. for 10 minutes. Next, an approximately 50 ml of a supernatant solution was sucked out with a Pasteur pipette, 100 ml of an zirconyl ammonium carbonate aqueous solution in which the concentration of zirconyl ammonium carbonate was 0.3 mol/L was added, and the obtained solution was left as it was for 24 hours at room temperature. Next, filtration was performed using a filter paper to extract (separate) a silica particle. The obtained silica particle was washed with ion exchange water until the pH of the filtrate reached 7, and vacuum dried at 120° C. for 6 hours. Then, the silica particle was calcined under an air atmosphere at 350° C. for 3 hours to obtain a carrier. The content of zirconia (zirconium oxide) based on the total mass of the FT synthesis catalyst to be formed was 3% by mass.

The subsequent treatment was performed in the same manner as in Example A-1 to obtain an activated FT synthesis catalyst E-A2.

The thin film index Z of the FT synthesis catalyst E-A2 represented by the equation was 0.18.
A1: specific surface area of silica 203 m²/g
A2: average pore diameter of silica 15.1 nm
B1: specific surface area of silica supporting zirconium as an oxide 142 m²/g
B2: average pore diameter of silica supporting zirconium as an oxide 13.5 nm
Y: 4.5

Example A-3

An activated FT synthesis catalyst E-A3 was obtained in the same manner as in Example A-2 except that the calcining temperature of silica was 650° C.

The thin film index Z of the FT synthesis catalyst E-A3 represented by the equation was 0.23.
A1: specific surface area of silica 183 m²/g
A2: average pore diameter of silica 14.8 nm
B1: specific surface area of silica supporting zirconium as an oxide 137 m²/g
B2: average pore diameter of silica supporting zirconium as an oxide 13.2 nm
Y: 4.5

Example A-4

An activated FT synthesis catalyst E-A4 was obtained in the same manner as in Example A-2 except that the calcining temperature of silica was 650° C., and the calcining temperature when the carrier was obtained was 400° C.

Example A-5

An activated FT synthesis catalyst E-A5 was obtained in the same manner as in Example A-2 except that the calcining temperature of silica was 400° C., the calcining temperature when the carrier was obtained was 350° C., and the calcining temperature of the carrier after impregnated with the nitric acid cobalt aqueous solution was 400° C.

Example A-6

An activated FT synthesis catalyst E-A6 was obtained in the same manner as in Example A-2 except that the calcining temperature of silica was 400° C., the amount of zirconia to be supported was 7% by mass, the calcining temperature when the carrier was obtained was 350° C., and the calcining temperature of the carrier after impregnated with the nitric acid cobalt aqueous solution was 400° C.

Example A-7

An activated FT synthesis catalyst E-A7 was obtained in the same manner as in Example A-2 except that the calcining temperature of silica was 400° C., the amount of zirconia to be supported was 7% by mass, the calcining temperature when the carrier was obtained was 350° C., the amount of cobalt oxide to be supported was 15% by mass, and the calcining temperature of the carrier after impregnated with the nitric acid cobalt aqueous solution was 400° C.

Example A-8

An activated FT synthesis catalyst E-A8 was obtained in the same manner as in Example A-2 except that the calcining temperature of silica was 400° C., the amount of zirconia to be supported was 7% by mass, the calcining temperature when the carrier was obtained was 350° C., the amount of cobalt oxide to be supported was 35% by mass, and the calcining temperature of the carrier after impregnated with the nitric acid cobalt aqueous solution was 400° C.

Example A-9

A spherical silica particle (average pore diameter of 10 nm, average particle size of 70 μm) was calcined in the air at 400° C. for 3 hours. Next, by the incipient wetness method, the calcined silica particle was impregnated with a mixed solution of 3% by mass of zirconyl nitrate in terms of zirconium oxide based on the total mass of the FT synthesis catalyst to be formed and 30% by mass of a nitric acid cobalt aqueous solution in terms of tricobalt tetraoxide based on the total mass of the FT synthesis catalyst to be formed. This was dried at 120° C. for 12 hours, and subsequently calcined in the air at 400° C. for 3 hours to obtain an FT synthesis catalyst.

The subsequent treatment was performed in the same manner as in Example A-1 to obtain an activated FT synthesis catalyst E-A9.

Comparative Example A-1

An activated FT synthesis catalyst CE-A1 was obtained in the same manner as in Example A-2 except that the calcining temperature of silica was 650° C., and the calcining temperature when the carrier was obtained was 500° C.

Comparative Example A-2

An activated FT synthesis catalyst CE-A2 was obtained in the same manner as in Example A-2 except that the calcining temperature of silica was 650° C., and the calcining temperature when the carrier was obtained was 650° C.

Comparative Example A-3

An activated FT synthesis catalyst CE-A3 was obtained in the same manner as in Example A-2 except that the amount of zirconia to be supported was 10% by mass.

[FT Synthesis Reaction]

In the FT synthesis catalysts obtained above, the catalyst performance was evaluated by performing the following FT synthesis reaction.

5 g of an activated FT synthesis catalyst obtained by performing a reduction treatment was extracted in a dry box under an inert atmosphere not to be oxidized, and placed with 30 ml of cetane in a stainless steel autoclave type reactor having an inner volume of 100 ml. Using a mixed gas at hydrogen gas/carbon monoxide gas of 2/1 (molar ratio) as the raw material, the Fischer-Tropsch synthesis reaction was started on the condition of W (mass of the catalyst)/F (flow rate of the synthesis gas)=3 g·h/mol, a temperature of 220° C., a pressure of 2.3 MPa, and the stirring rate of 1000 rpm. The gas composition at the outlet of the reactor was analyzed over time by gas chromatography, and from the analysis data, the conversion rate of carbon monoxide (CO conversion rate) was calculated. The CO conversion rate $TCO_5$ after 5 hours have passed from the start of the reaction, and the proportion [$TCO_{50}/TCO_5$] of the CO conversion rate $TCO_{50}$ after 50 hours have passed from the start of the reaction to CO conversion rate $TCO_5$ after 5 hours have passed from the start of the reaction are shown in Tables.

As shown in Table 1, it was found that in the catalysts E-A1 to E-A9 produced in which the amount of zirconia to be supported, and $T_1$, $T_2$, and $T_3$, or $T_4$ and $T_5$ satisfied the conditions according to the present invention, the CO conversion rate $TCO_5$ in the Fischer-Tropsch synthesis reaction was sufficiently high, and the proportion [$TCO_{50}/TCO_5$] of the CO conversion rate $TCO_{50}$ after 50 hours had passed from the start of the reaction to CO conversion rate $TCO_5$ after 5 hours had passed from the start of the reaction also indicated a high value. In the catalysts CE-A1 and CE-A2 produced on the condition in which $T_2$ did not satisfy the equation (2), the CO conversion rate $TCO_5$ and [$TCO_{50}/TCO_5$] indicated lower values than those in the catalysts E-A3 and E-A4. In the catalyst CE-A1 in which the amount of zirconia to be supported was 10% by mass, the CO conversion rate $TCO_5$ and [$TCO_{50}/TCO_5$] indicated lower values than those in the catalyst E-A2.

Example B-1

<Preparation of FT Synthesis Catalyst>

A spherical silica particle (average pore diameter of 15 nm, average particle size of 70 μm, specific surface area 255 m²/g) was calcined in the air at 650° C. for 3 hours. Next, by the incipient wetness method, the calcined silica particle was impregnated with 3% by mass of zirconyl nitrate in terms of zirconium oxide based on the total mass of the FT synthesis catalyst to be formed. The silica particle after

TABLE 1

| | Catalyst | $SiO_2$ calcining temperature (° C.) | Method for supporting $ZrO_2$ | Amount of $ZrO_2$ to be supported (% by mass) | $ZrO_2$ calcining temperature (° C.) | Order of $ZrO_2$ and $Co_3O_4$ to be supported | Amount of $Co_3O_4$ to be supported (% by mass) | $Co_3O_4$ calcining temperature (° C.) | Catalyst performance $TCO_5$ (%) | $TCO_{50}/TCO_5$ |
|---|---|---|---|---|---|---|---|---|---|---|
| Example A-1 | E-A1 | 450 | Incipient Wetness | 3 | 350 | $ZrO_2 \rightarrow Co_3O_4$ | 30 | 450 | 65 | 0.89 |
| Example A-2 | E-A2 | 450 | Thin film supported | 3 | 350 | $ZrO_2 \rightarrow Co_3O_4$ | 30 | 450 | 67 | 0.90 |
| Example A-3 | E-A3 | 650 | Thin film supported | 3 | 350 | $ZrO_2 \rightarrow Co_3O_4$ | 30 | 450 | 67 | 0.87 |
| Example A-4 | E-A4 | 650 | Thin film supported | 3 | 400 | $ZrO_2 \rightarrow Co_3O_4$ | 30 | 450 | 66 | 0.86 |
| Example A-5 | E-A5 | 400 | Thin film supported | 3 | 350 | $ZrO_2 \rightarrow Co_3O_4$ | 30 | 400 | 67 | 0.91 |
| Example A-6 | E-A6 | 400 | Thin film supported | 7 | 350 | $ZrO_2 \rightarrow Co_3O_4$ | 30 | 400 | 68 | 0.94 |
| Example A-7 | E-A7 | 400 | Thin film supported | 7 | 350 | $ZrO_2 \rightarrow Co_3O_4$ | 15 | 400 | 72 | 0.94 |
| Example A-8 | E-A8 | 400 | Thin film supported | 7 | 350 | $ZrO_2 \rightarrow Co_3O_4$ | 35 | 400 | 66 | 0.94 |
| Example A-9 | E-A9 | 400 | Incipient Wetness | 3 | 400 | At the same time | 30 | 400 | 68 | 0.86 |

TABLE 2

| | Catalyst | $SiO_2$ calcining temperature (° C.) | Method for supporting $ZrO_2$ | Amount of $ZrO_2$ to be supported (% by mass) | $ZrO_2$ calcining temperature (° C.) | Order of $ZrO_2$ and $Co_3O_4$ to be supported | Amount of $Co_3O_4$ to be supported (% by mass) | $Co_3O_4$ calcining temperature (° C.) | Catalyst performance $TCO_5$ (%) | $TCO_{50}/TCO_5$ |
|---|---|---|---|---|---|---|---|---|---|---|
| Comparative Example A-1 | CE-A1 | 650 | Thin film supported | 3 | 500 | $ZrO_2 \rightarrow Co_3O_4$ | 30 | 450 | 57 | 0.81 |
| Comparative Example A-2 | CE-A2 | 650 | Thin film supported | 3 | 650 | $ZrO_2 \rightarrow Co_3O_4$ | 30 | 450 | 66 | 0.79 |
| Comparative Example A-3 | CE-A3 | 450 | Thin film supported | 10 | 350 | $ZrO_2 \rightarrow Co_3O_4$ | 30 | 450 | 62 | 0.78 | impregnated with zirconyl nitrate was dried at 120° C. for 12 hours, and subsequently calcined in the air at 300° C. for 3 hours to obtain a carrier.

By the incipient wetness method, the obtained carrier was impregnated with 30% by mass of a nitric acid cobalt aqueous solution in terms of tricobalt tetraoxide based on the total mass of the FT synthesis catalyst to be formed. The carrier after impregnated with the nitric acid cobalt aqueous solution was dried at 120° C. for 12 hours, and subsequently calcined in the air at 450° C. for 3 hours to obtain an FT synthesis catalyst.

The mass of the FT synthesis catalyst obtained here is the reference when the amounts of the zirconyl nitrate and nitric acid cobalt aqueous solution to be used for impregnation are determined. Namely, the mass in the state where the total amount of the supported zirconia atom is converted into zirconium oxide (zirconia) and the total amount of the supported cobalt atom is converted into tricobalt tetraoxide (cobalt oxide) is the reference.

<Reduction of FT Synthesis Catalyst>

The FT synthesis catalyst was reduced under a hydrogen stream at 350° C. for 7 hours to obtain an activated FT synthesis catalyst E-B1.

Example B-2

An activated FT synthesis catalyst E-B2 was obtained in the same manner as in Example B-1 except that the calcining temperature of the carrier after impregnated with the nitric acid cobalt aqueous solution was changed from 450° C. to 400° C.

Example B-3

An activated FT synthesis catalyst E-B3 was obtained in the same manner as in Example B-1 except that the calcining temperature when the carrier was obtained was changed from 300° C. to 350° C.

Example B-4

An activated FT synthesis catalyst E-B4 was obtained in the same manner as in Example B-1 except that the calcining temperature when the carrier was obtained was changed from 300° C. to 250° C.

Example B-5

A spherical silica particle (average pore diameter of 10 nm, average particle size of 70 μm) was calcined in the air at 650° C. for 3 hours. Next, by the incipient wetness method, the calcined silica particle was impregnated with 3% by mass of zirconyl nitrate in terms of zirconium oxide based on the total mass of the FT synthesis catalyst to be formed. The silica particle after impregnated with zirconyl nitrate was dried at 120° C. for 12 hours, and subsequently calcined in the air at 350° C. for 3 hours to obtain a carrier.

By the incipient wetness method, the obtained carrier was impregnated with 30% by mass of a nitric acid cobalt aqueous solution in terms of tricobalt tetraoxide based on the total mass of the FT synthesis catalyst to be formed. The carrier after impregnated with the nitric acid cobalt aqueous solution was dried at 120° C. for 12 hours, and subsequently calcined in the air at 450° C. for 3 hours to obtain an FT synthesis catalyst.

<Reduction of FT Synthesis Catalyst>

The FT synthesis catalyst was reduced under a hydrogen stream at 350° C. for 7 hours to obtain an activated FT synthesis catalyst E-B5.

Example B-6

An activated FT synthesis catalyst E-B6 was obtained in the same manner as in Example B-5 except that the calcining temperature of silica was 400° C., and the calcining temperature of the carrier after impregnated with the nitric acid cobalt aqueous solution was 400° C.

Example B-7

An activated FT synthesis catalyst E-B7 was obtained in the same manner as in Example B-5 except that the calcining temperature of silica was 400° C., the amount of zirconia to be supported was 7% by mass, and the calcining temperature of the carrier after impregnated with the nitric acid cobalt aqueous solution was 400° C.

Example B-8

An activated FT synthesis catalyst E-B8 was obtained in the same manner as in Example B-5 except that the calcining temperature of silica was 400° C., the amount of zirconia to be supported was 7% by mass, the amount of cobalt oxide to be supported was 15% by mass, and the calcining temperature of the carrier after impregnated with the nitric acid cobalt aqueous solution was 400° C.

Example B-9

An activated FT synthesis catalyst E-B9 was obtained in the same manner as in Example B-1 except that a spherical silica particle (average pore diameter of 17.5 nm, average particle size of 100 μm) was used, and the calcining temperature of the carrier after impregnated with the nitric acid cobalt aqueous solution was 400° C.

Example B-10

An activated FT synthesis catalyst E-B10 was obtained in the same manner as in Example B-1 except that a spherical silica particle (average pore diameter of 20 nm, average particle size of 100 μm) was used, and the calcining temperature of the carrier after impregnated with the nitric acid cobalt aqueous solution was 400° C.

Example B-11

An activated FT synthesis catalyst E-B11 was obtained in the same manner as in Example BA except that a spherical silica particle (average pore diameter of 25 nm, average particle size of 100 μm) was used, and the calcining temperature of the carrier after impregnated with the nitric acid cobalt aqueous solution was 400° C.

Example B-12

A spherical silica particle (average pore diameter of 15 nm, average particle size of 70 μm) was calcined in the air at 650° C. for 3 hours. Next, by the incipient wetness method, the calcined silica particle was impregnated with 3% by mass of zirconyl nitrate in terms of zirconium oxide based on the total mass of the FT synthesis catalyst to be formed. The silica particle after impregnated with zirconyl nitrate was dried at 120° C. for 12 hours, and subsequently calcined in the air at 300° C. for 3 hours to obtain a carrier.

By the incipient wetness method, the obtained carrier was impregnated with 15% by mass of a ruthenium chloride aqueous solution in terms of ruthenium oxide ($RuO_2$) based on the total mass of the FT synthesis catalyst to be formed. The carrier after impregnated with the ruthenium chloride aqueous solution was dried at 120° C. for 12 hours, and subsequently calcined in the air at 400° C. for 3 hours to obtain an FT synthesis catalyst.

<Reduction of FT Synthesis Catalyst>

The FT synthesis catalyst was reduced under a hydrogen stream at 350° C. for 7 hours to obtain an activated FT synthesis catalyst E-B12.

Comparative Example B-1

An activated FT synthesis catalyst CE-B1 was obtained in the same manner as in Example B-1 except that the calcining temperature when the carrier was obtained was 500° C.

Comparative Example B-2

An activated FT synthesis catalyst CE-B2 was obtained in the same manner as in Example B-1 except that the calcining temperature when the carrier was obtained was 650° C.

Comparative Example B-3

An activated FT synthesis catalyst CE-B3 was obtained in the same manner as in Example B-1 except that the calcining temperature of silica was 450° C., the amount of zirconia to be supported was 10% by mass, and the calcining temperature when the carrier was obtained was 350° C.

Comparative Example B-4

An activated FT synthesis catalyst CE-B4 was obtained in the same manner as in Example B-1 except that a spherical silica particle (average pore diameter of 7.5 nm, average particle size of 100 μm) was used, and the calcining temperature when the carrier was obtained was 350° C.

Comparative Example B-5

An activated FT synthesis catalyst CE-B5 was obtained in the same manner as in Example B-1 except that a spherical silica particle (average pore diameter of 5 nm, average particle size of 100 μm) was used, and the calcining temperature when the carrier was obtained was 350° C.

Comparative Example B-6

An activated FT synthesis catalyst CE-B6 was obtained in the same manner as in Example B-1 except that a spherical silica particle (average pore diameter of 30 nm, average particle size of 100 μm) was used, and the calcining temperature when the carrier was obtained was 500° C.

Comparative Example B-7

An activated FT synthesis catalyst CE-B7 was obtained in the same manner as in Example B-1 except that the calcining temperature when the carrier was obtained was 200° C.

Comparative Example B-8

An activated FT synthesis catalyst CE-B8 was obtained in the same manner as in Example B-1 except that the calcining temperature of the carrier after impregnated with the nitric acid cobalt aqueous solution was 350° C.

[Measurement of Mesopore Volume of Catalyst]

In the FT synthesis catalysts obtained above, the mesopore volume of the catalyst was calculated by the following method. First, to remove the moisture content adsorbed by the FT synthesis catalyst, a pre-treatment of evacuation at 300° C. for 5 hours was performed, for example. In the catalyst after the pre-treatment, using a BELSORP-max made by BEL Japan, Inc., adsorption and desorption isotherms were automatically measured by the volumetric gas adsorption method at a liquid nitrogen temperature (−196° C.) using nitrogen. The analysis software (BEL Master™) attached to the apparatus was used for analysis of data. The measured adsorption and desorption isotherms of nitrogen were automatically analyzed by the BJH method, and the mesopore volume of the FT synthesis catalyst per unit mass ($cm^3/g$) was calculated.

[Measurement of Specific Surface Area of Catalyst]

In the FT synthesis catalysts obtained above, the specific surface area of the catalyst was calculated by the following method. First, to remove the moisture content adsorbed by the FT synthesis catalyst, a pre-treatment of evacuation at 300° C. for 5 hours was performed, for example. In the catalyst after the pre-treatment, using a BELSORP-max made by BEL Japan, Inc., adsorption and desorption isotherms were automatically measured by the volumetric gas adsorption method at a liquid nitrogen temperature (−196° C.) using nitrogen. The analysis software (BEL Master™) attached to the apparatus was used for analysis of data. The measured adsorption and desorption isotherms of nitrogen were automatically analyzed by the BET equation, and the surface area of the FT synthesis catalyst per unit mass ($m^2/g$) was calculated.

[Measurement of Attrition of Catalyst]

In the FT synthesis catalysts obtained above, the attrition (catalyst wear rate) was measured according to ASTM D5757.

[FT Synthesis Reaction]

In the FT synthesis catalysts obtained above, the catalyst performance was evaluated by performing the following FT synthesis reaction.

5 g of an activated FT synthesis catalyst obtained by performing a reduction treatment was extracted in a dry box under an inert atmosphere not to be oxidized, and placed with 30 ml of normal hexadecane in a stainless steel autoclave type reactor having an inner volume of 100 ml. Using a mixed gas at hydrogen gas/carbon monoxide gas of 2/1 (molar ratio) as the raw material, the Fischer-Tropsch synthesis reaction was started on the condition of W (mass of the catalyst)/F (flow rate of the synthesis gas)=3 g·h/mol, a temperature of 220° C., a pressure of 2.3 MPa, and a stirring rate of 1000 rpm. The gas composition at the outlet of the reactor was analyzed over time by gas chromatography, and from the analysis data, the conversion rate of carbon monoxide (CO conversion rate) was calculated. The CO conversion rate $TCO_5$ after 5 hours have passed from the start of the reaction, and the proportion [$TCO_{50}/TCO_5$] of the CO conversion rate $TCO_{50}$ after 50 hours have passed from the start of the reaction to CO conversion rate $TCO_5$ after 5 hours have passed from the start of the reaction are shown in Tables.

TABLE 3

| Catalyst | | SiO₂ average pore diameter (nm) | SiO₂ calcining temperature (° C.) | Amount of ZrO₂ to be supported (% by mass) | ZrO₂ calcining temperature (° C.) | Amount of Co₃O₄ or RuO₂ to be supported (% by mass) | Calcining temperature of Co₃O₄ or RuO₂ (° C.) | Mesopore volume (cm³/g) | Specific surface area (m²/g) | Attrition (%) | Catalyst performance | |
|---|---|---|---|---|---|---|---|---|---|---|---|---|
| | | | | | | | | | | | TCO₅ (%) | TCO₅₀/TCO₅ |
| Example B-1 | E-B1 | 15 | 650 | 3 | 300 | 30 | 450 | 0.41 | 152 | 0.8 | 68 | 0.96 |
| Example B-2 | E-B2 | 15 | 650 | 3 | 300 | 30 | 400 | 0.42 | 161 | 1.1 | 72 | 0.97 |
| Example B-3 | E-B3 | 15 | 650 | 3 | 350 | 30 | 450 | 0.38 | 135 | 0.6 | 67 | 0.93 |
| Example B-4 | E-B4 | 15 | 650 | 3 | 250 | 30 | 450 | 0.41 | 155 | 0.9 | 70 | 0.97 |
| Example B-5 | E-B5 | 10 | 650 | 3 | 350 | 30 | 450 | 0.36 | 130 | 0.4 | 66 | 0.87 |
| Example B-6 | E-B6 | 10 | 400 | 3 | 350 | 30 | 400 | 0.40 | 145 | 1.0 | 65 | 0.91 |
| Example B-7 | E-B7 | 10 | 400 | 7 | 350 | 30 | 400 | 0.39 | 141 | 1.1 | 67 | 0.93 |
| Example B-8 | E-B8 | 10 | 400 | 7 | 350 | 15 | 400 | 0.42 | 157 | 1.0 | 70 | 0.94 |
| Example B-9 | E-B9 | 17.5 | 650 | 3 | 300 | 30 | 400 | 0.52 | 170 | 1.8 | 65 | 0.98 |
| Example B-10 | E-B10 | 20 | 650 | 3 | 300 | 30 | 400 | 0.59 | 185 | 2.3 | 64 | 0.98 |
| Example B-11 | E-B11 | 25 | 650 | 3 | 300 | 30 | 400 | 0.65 | 197 | 2.8 | 64 | 0.97 |
| Example B-12 | E-B12 | 15 | 650 | 3 | 300 | 15 | 400 | 0.42 | 159 | 1.0 | 70 | 0.98 |

TABLE 4

| Catalyst | | SiO₂ average pore diameter (nm) | SiO₂ calcining temperature (° C.) | Amount of ZrO₂ to be supported (% by mass) | ZrO₂ calcining temperature (° C.) | Amount of Co₃O₄ or RuO₂ to be supported (% by mass) | Calcining temperature of Co₃O₄ or RuO₂ (° C.) | Mesopore volume (cm³/g) | Specific surface area (m²/g) | Attrition (%) | Catalyst performance | |
|---|---|---|---|---|---|---|---|---|---|---|---|---|
| | | | | | | | | | | | TCO₅ (%) | TCO₅₀/TCO₅ |
| Comparative Example B-1 | CE-B1 | 15 | 650 | 3 | 500 | 30 | 450 | 0.32 | 126 | 0.4 | 58 | 0.82 |
| Comparative Example B-2 | CE-B2 | 15 | 650 | 3 | 650 | 30 | 450 | 0.30 | 114 | 0.3 | 53 | 0.80 |
| Comparative Example B-3 | CE-B3 | 15 | 450 | 10 | 350 | 30 | 450 | 0.31 | 118 | 1.0 | 65 | 0.79 |
| Comparative Example B-4 | CE-B4 | 7.5 | 650 | 3 | 350 | 30 | 450 | 0.26 | 102 | 0.2 | 55 | 0.62 |
| Comparative Example B-5 | CE-B5 | 5 | 650 | 3 | 350 | 30 | 450 | 0.23 | 98 | 0.3 | 54 | 0.59 |
| Comparative Example B-6 | CE-B6 | 30 | 650 | 3 | 500 | 30 | 450 | 0.70 | 205 | 3.6 | 60 | 0.98 |
| Comparative Example B-7 | CE-B7 | 15 | 650 | 3 | 200 | 30 | 450 | 0.40 | 145 | 0.9 | 52 | 0.84 |
| Comparative Example B-8 | CE-B8 | 15 | 650 | 3 | 300 | 30 | 350 | 0.40 | 125 | 1.3 | 45 | 0.98 |

As shown in Table 3, it was found that in the catalysts E-B1 to E-B12 in which the calcining temperature of the carrier precursor in which the zirconia compound was contained, the amount of zirconia to be supported, and the mesopore volume and specific surface area satisfied the conditions according to the present invention, a sufficiently low attrition was shown, the CO conversion rate $TCO_5$ in the Fischer-Tropsch synthesis reaction was sufficiently high, and the proportion [$TCO_{50}/TCO_5$] of the CO conversion rate $TCO_{50}$ after 50 hours had passed from the start of the reaction to CO conversion rate $TCO_5$ after 5 hours had passed from the start of the reaction also indicated a high value.

The invention claimed is:

1. A Fischer-Tropsch synthesis catalyst, comprising:
   a carrier obtained by calcining a carrier precursor containing silica and a zirconia compound at a temperature of 250° C. or higher and 400° C. or lower, and cobalt oxide and/or ruthenium oxide supported on the carrier, wherein a content of the zirconia compound in the carrier precursor is 3 to 7% by mass in terms of zirconium oxide based on a total mass of the catalyst, and a mesopore volume is 0.35 cm³/g or more and a specific surface area is 130 m²/g or more.

2. The catalyst according to claim 1, wherein the average pore diameter of silica is 10 to 15 nm.

* * * * *